(12) United States Patent
Hunt (10) Patent No.: US 7,826,652 B2
(45) Date of Patent: Nov. 2, 2010

(54) METHOD FOR FORMING AN OPTIMALLY EXPOSED IMAGE OF CYTOLOGICAL SPECIMEN

(75) Inventor: Barry Hunt, Andover, MA (US)

(73) Assignee: Cytyc Corporation, Marlborough, MA (US)

( * ) Notice: Subject to any disclaimer, the term of this patent is extended or adjusted under 35 U.S.C. 154(b) by 987 days.

(21) Appl. No.: 11/613,166

(22) Filed: Dec. 19, 2006

(65) Prior Publication Data

US 2008/0144898 A1 Jun. 19, 2008

(51) Int. Cl.
    *G06K 9/00* (2006.01)
(52) U.S. Cl. .................. 382/133; 382/284
(58) Field of Classification Search .......... 382/128, 382/133, 134, 284, 318
    See application file for complete search history.

(56) References Cited

U.S. PATENT DOCUMENTS 7,006,674 B1    2/2006  Zahniser et al. ............. 382/128
2002/0081014 A1    6/2002  Ravkin ..................... 382/134
2003/0011762 A1*    1/2003  Rinn ....................... 356/237.4
2003/0128893 A1*    7/2003  Castorina et al. ............ 382/284
2004/0218804 A1    11/2004  Affleck et al. ............... 382/141

FOREIGN PATENT DOCUMENTS

EP    1273877 A2    1/2003

OTHER PUBLICATIONS

PCT International Search Report for PCT/US2007/086028, Applicant Cytyc Corp., Forms PCT/ISA/210 and 220, dated Jun. 12, 2008 (5 pages).
PCT Written Opinion of the International Search Authority for PCT/US2007/086028, Applicant Cytyc Corp., Form PCT/ISA/237, dated Jun. 12, 2008 (6 pages).

* cited by examiner

*Primary Examiner*—Andrew W Johns
(74) *Attorney, Agent, or Firm*—Vista IP Law Group LLP (57) ABSTRACT

First and second images of respective portions of a cytological specimen are acquired at different brightness levels. Sections of the respective first image are selected and combined with selected sections of the second image of each portion to form a composite image, so that non-nuclei cytological components that would otherwise appear dark in a single exposure image are brighter in the composite image.

18 Claims, 13 Drawing Sheets

METHOD FOR FORMING AN OPTIMALLY EXPOSED IMAGE OF CYTOLOGICAL SPECIMEN

FIELD OF INVENTION

The present invention relates to imaging and analysis of biological specimens, and more particularly, to generating an optimally exposed image of a specimen by combining sections of different images of the specimen.

BACKGROUND

Medical professionals and cytotechnologists frequently review biological specimens affixed to a specimen carrier, such as a slide, to analyze whether a person from whom the specimen was obtained has or may have a particular medical condition. For example, it is well known to examine a cytological specimen in order to detect the presence of malignant or pre-malignant cells as part of a Papanicolaou (Pap) smear test. To facilitate this review process, automated systems have been employed to perform a pre-screening of the specimen slides in order to focus the cytotechnologist's attention on the most (or at least more) pertinent cells or groups of cells in the respective specimen, while discarding less relevant cells from further review. One such automated imaging system is the Thinprep Imaging System, available from Cytyc Corporation, 250 Campus Drive, Marlborough, Mass. 01752 (www-.cytyc.com).

Figure 1:
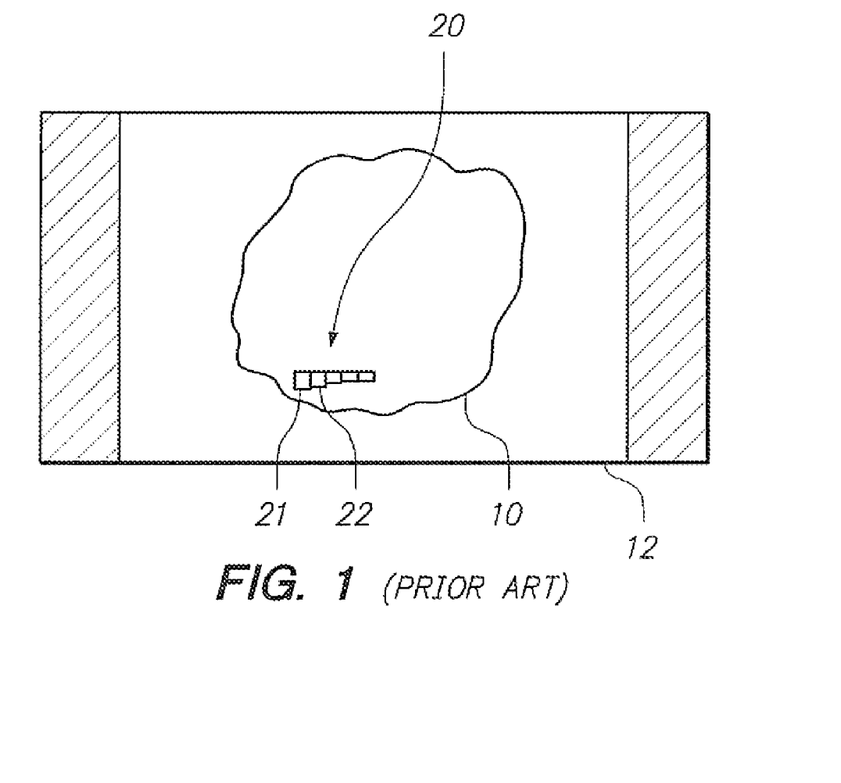
FIG. 1 illustrates a slide having a cytological specimen and portions thereof.

More particularly, referring to FIG. 1, a cytological specimen 10 is prepared and carried by a slide 12. The cytological specimen 10 includes a number of portions 20, e.g., a first portion 21, a second portion 22, a third portion 23, etc. FIG. 1 generally illustrates square-shaped portions for purposes of illustration. The number of portions 20 can vary depending on the size of portions 20, the size of the specimen 10, and the size of the area of the specimen to be imaged. For example, a specimen 10 can include about 3,000 portions 20 that are to be imaged.

Figure 2:
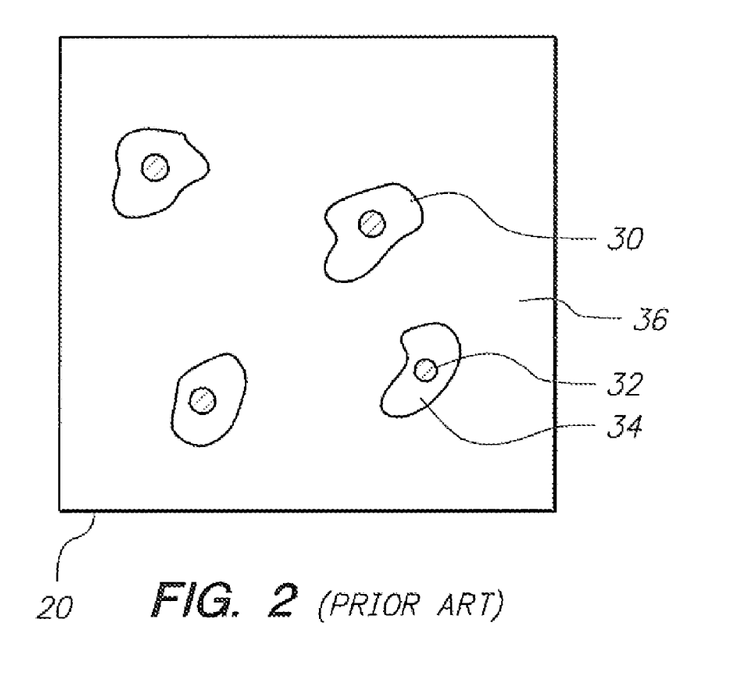
FIG. 2 illustrates components of a portion of a cytological specimen.

Referring to FIG. 2, each portion 20 may include various cytological components, including cells 30. Each cell 30 includes a nucleus 32 and cytoplasm 34 surrounding the nucleus 32. The area of a portion 20 that is not occupied by cells 30 is generally referred to as background 36. The collection of portions that forms a specimen includes a collection of cells 30 and background 36 areas.

Figure 3:
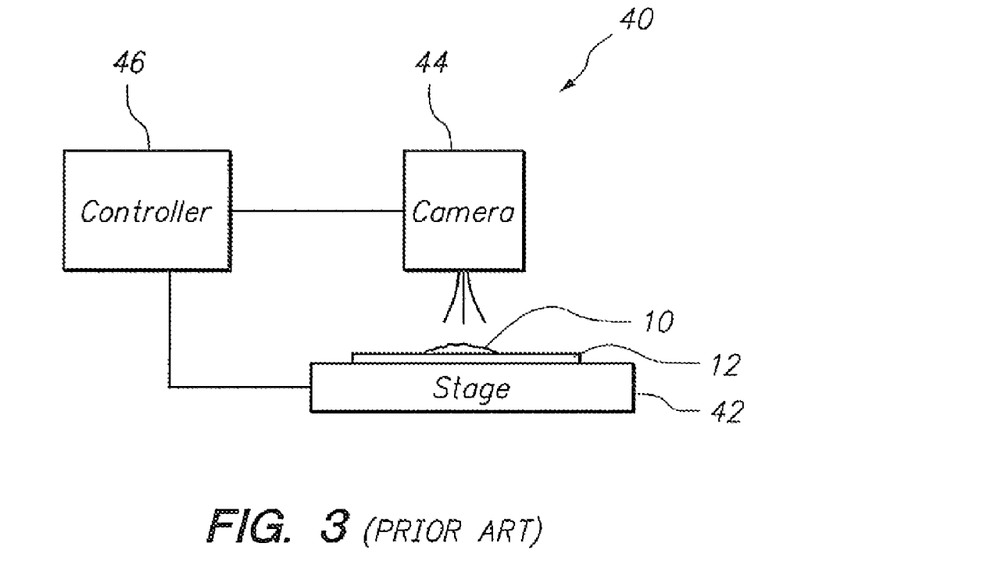
FIG. 3 generally illustrates a known imaging system for use in generating an image of a specimen at a single brightness level.

Referring to FIG. 3, a specimen slide 12 is processed by an imaging system 40, such as the Thin Prep Imaging System. One exemplary imaging system 40 is also described in U.S. Pat. No. 7,006,674, the contents of which are incorporated herein by reference as though set forth in full. An imaging system 40 typically includes a stage 42 upon which the slide 12 is placed, a camera 44 for taking images of the specimen 10, and a processor or controller 46 for controlling the stage 42 and the camera 46. The imaging system 40 can also include other components, as described in the above-incorporated U.S. Pat. No. 7,006,674.

In use, the camera 44 acquires an image of a first portion 21 of the specimen 10. The stage 42 is moved to move the specimen 10 so that the next portion 22 is in view of the camera 44. An image of the second or next portion 22 is acquired by the camera 44. The stage 42 is moved, and so on, until an image of each necessary portion 20 is acquired. In known systems, the image of each portion 20 is acquired at a particular brightness or exposure level that is selected to be sufficiently bright so that most sections of the image (cytoplasm 34 and background 36) are sufficiently bright and visible.

Figure 4:
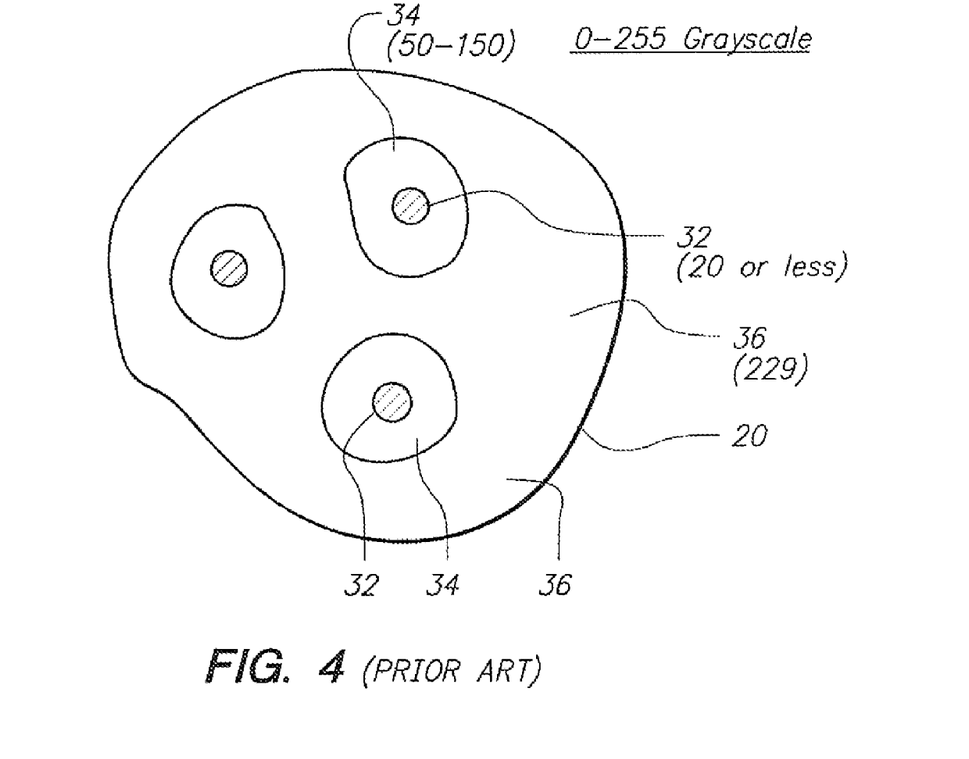
FIG. 4 illustrates brightness levels of components of a portion of an image of a cytological specimen in an image acquired at a single brightness level using a known imaging system.

For example, referring to FIG. 4, in one known imaging system, the camera 44 is set to an exposure level of 229 based on a 0-255 grayscale. The result of this exposure setting is that the image of a portion 20 of the cytological specimen 10 has background 36 at a brightness level of 229, cytoplasm 34 at a brightness level about 50 to 150, e.g., about 100 to 150, and nuclei 32 at a brightness level of about 20. While this exposure setting may be suitable for cytoplasm 34 and background 36, nuclei 32 in the image are not very visible since the brightness level is only 20.

While known systems and methods have been used effectively to image cells in the past, they can be improved. Initially, the resulting brightness of different cytological components can vary significantly, and with known imaging systems, it is not always possible to see individual cell nuclei 32 and nuclei 32 that are clumped together. For example, as shown in FIG. 4, the brightness of the nuclei 32 in the image is only about 20. Thus, the shape, size, color, and internal components of nuclei 32 may not be observable. These shortcomings may be more pronounced when attempting to view cell nuclei 32 that are clumped together. Further, smaller nuclei 32 details may not be observable at all at these low brightness levels.

One potential solution to this problem is increasing the brightness or exposure so that the nuclei are brighter. However, this is not very feasible. If the exposure setting is 229, the exposure can only be increased to 255 (i.e., about a 10% increase in exposure). This results in increasing the brightness of nuclei 32 by about 10%, i.e., increasing brightness from 20 to about 22. This nominal increase in brightness is not sufficient to provide the desired image quality and nuclei 32 detail. Additionally, the camera cannot resolve anything brighter than 255, and details in the brighter background and cytoplasm sections are lost as the pixel values peak at a brightness of 255. Thus, increasing the increasing the exposure only provides minimal improvement to nuclei 32 brightness while degrading other portions of the image.

It would be advantageous, therefore, to form an optimally exposed image of a cytological specimen. It would also be advantageous to form an image with brighter nuclei and groups of nuclei without saturating other parts of the image. It would also be desirable to illuminate nuclei and portions thereof that were not previously visible using known systems.

SUMMARY

According to one embodiment, a method for forming an optimally exposed image of a cytological specimen includes acquiring a first and second images of a first portion of the specimen, wherein the first image is acquired at a first brightness level, and the second image is acquired at a second brightness level higher than the first brightness level. The method further includes selecting and combining respective sections of the first and second images to form an optimally (or substantially optimally) exposed image.

In one embodiment, the selected sections of the first image correspond to non-nuclei components of the first portion of the specimen, and the selected sections of the second image correspond to the nuclei components of the first portion of the specimen, wherein the selected sections of the first and second images are combined to form an optimally exposed composite image.

In one embodiment, the method further includes generating a mask of one of the acquired images. The mask can be generated by passing one of the images through a filter, such as a low-pass filter, and binarizing the output of the filter to generate the mask. The mask includes binary values that identify nuclei and non-nuclei components of the first portion of the image of the specimen. The method also includes selecting sections of the first image that correspond to non-nuclei components of the first portion of the specimen according to the mask and selecting sections of the second image corresponding to the nuclei components of the first portion of the specimen according to the mask. The selected sections of the first and second images are combined to form an optimally exposed image.

In various embodiments, the first and second images are images of cells. Nuclei of cells are more visible in the second image at the second brightness or exposure level than in the first image at the first brightness or exposure level, and non-nuclei components, such as cytoplasm and background, are more visible in the first image at the first, lower brightness level. For example, the first image at the first brightness level can include nuclei at a brightness of about 20, non-nuclei components at a brightness of about 50-150, and background at a brightness of about 229, based on gray scale range of 0-255, whereas the second image at the second brightness level contains nuclei at a brightness of about 80, and non-nuclei components and background that are saturated, based on a gray scale range of 0-255. The second brightness level can be brighter than the first brightness level by varying degrees. In one embodiment, the second brightness level is about four times as bright as the first brightness level. In another embodiment, the first brightness level is a non-saturation brightness level, and the second brightness level is a saturation brightness level.

Sections of different images can be selected based on the types of components corresponding to particular sections. For example, sections of the first image at the first, lower brightness can correspond to non-nuclei components of the specimen, and sections of the second image at the second, higher brightness level can correspond to nuclei components of the specimen.

Sections of different images can be selected according to a mask, which can contain "0" and "1" values corresponding to different cytological components. Certain mask values can represent nuclei components, and other mask values can represent non-nuclei components. The mask can be generated based on either image. Further, the mask can be generated by binarizing the output of a filter, such as a low pass filter, that processes first and second image data. Using the mask, sections of the first image at the first brightness level corresponding to non-nuclei components are selected from the first image, and sections of the second image at the second brightness level corresponding to nuclei components are selected from the second image according to the mask. The selected sections can then be combined to form an optimally exposed image.

Selected sections of different images can be combined in various ways. For example, selected sections of the first and second images can be combined by replacing certain pixels of one image with selected pixels of another image, or merging selected pixels of the first and second images together. The steps of selecting sections of different image portions and combining the selected sections can be repeated to process all of the first and second images.

Other aspects of embodiments are described herein and will become apparent upon reading the following detailed description with reference to the accompanying drawings.

BRIEF DESCRIPTION OF THE DRAWINGS

Referring now to the drawings in which like reference numbers represent corresponding parts throughout and in which.

DETAILED DESCRIPTION OF ILLUSTRATED EMBODIMENTS

Embodiments of the invention improve upon known imaging systems by providing methods for generating an optimally exposed image of a cytological specimen, which includes selected sections of different images acquired at different brightness levels or exposures. Sections of a first image at a first exposure level and sections of a second image at a second brightness level are selected and combined to form a composite image. Sections of the brighter image can be selected to better show darker components, such as nuclei, and sections of the other image can be selected to show components, such as cytoplasm and background, which are sufficiently bright without additional exposure. Such optimally exposed composite images include greater cytological detail compared to images taken at a single exposure, which is achieved without saturating other parts of the image since sections in the brighter image that might be saturated can be discarded, and non-saturated sections of the image at the lower brightness level can be selected instead.

Figure 5:
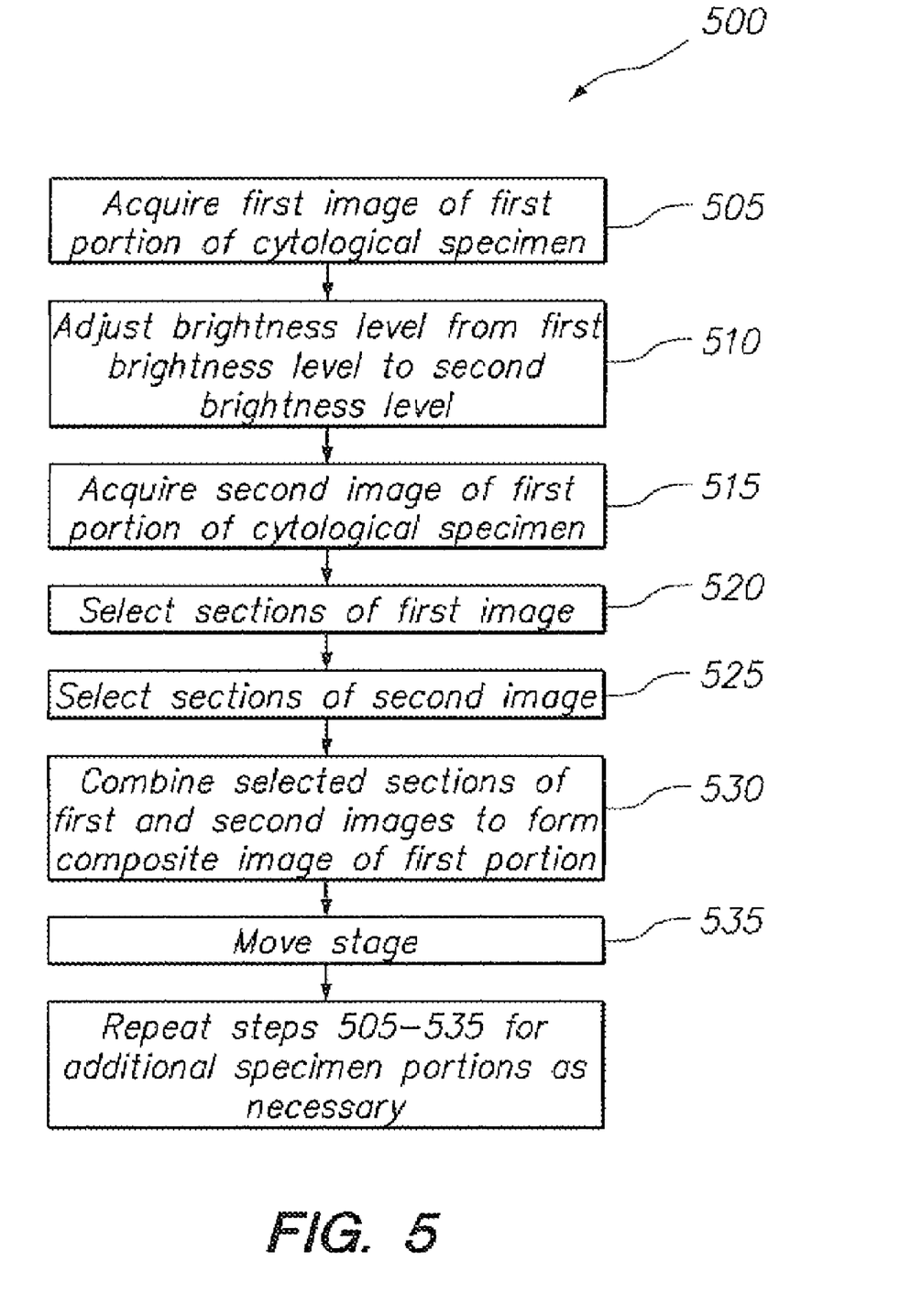
FIG. 5 is a flow chart of a method of forming an optimally exposed image of a cytological specimen according to one embodiment.

Referring to FIG. 5, one embodiment is directed to a method 500 for forming an optimally exposed image of a cytological specimen by combining sections of different images at different brightness or exposure levels. In step 505, the camera and/or stage is positioned to take a first image of a first portion of cytological specimen, which can be an image of an individual portion of the specimen, an image of a group of portions of a specimen, and an image of all portions of the specimen, i.e., an image of the entire specimen. For purposes of explanation, this specification refers to an image of an individual portion of a specimen. The first image is acquired at a first brightness or exposure level (generally, "brightness level"). In step 510, after the first image of the first portion is acquired, the first brightness level (B1) is adjusted to a second brightness level (B2), which is different than B1. In step 515, a second image of the same first portion is acquired at B2. In step 520, sections of the first image of the first portion are selected. In step 525, sections of the second image of the first portion are selected. In step 530, the sections selected from the first and second images of the first portion are combined into a first composite image of the first portion of the specimen. In step 535, the stage is moved to position a second portion of the specimen for imaging. Steps 505-535, described with reference to the first portion, are repeated for the second portion, repeated for the third portion, and so on for each additional portion of the cytological specimen that is to be imaged.

With the sequence shown in FIG. 5, the specimen is processed portion-by-portion, i.e., with sections of different images of a first portion are selected and combined, followed by sections of different images of a second portion being selected and combined, and so forth for each portion of the specimen. Alternatively, the steps shown in FIG. 5 can be performed in different orders. For example, images of a plurality of portions can be acquired, and after the images are acquired, they can then be processed. Processing can involve selecting sections of different images of a first portion, selecting sections of different images of a second portion, and so on for other portions. The selected sections can then be combined. Thus, for example, steps 520 and 525 can be performed for each portion of the specimen, and then selected sections of different images of the first portion, selected sections of different images of the second portion, and so on, can be combined at the same time as step 530 to form an optimally exposed image. In other words, the combination of selected sections can occur after sections of each portion are selected or, alternatively, at the same time after sections of all of the portions are selected. Accordingly, the method shown in FIG. 5 applies to both portion-by-portion processing and processing that involves combining selected sections of multiple portions or all portions at the same or later time.

Figure 6:
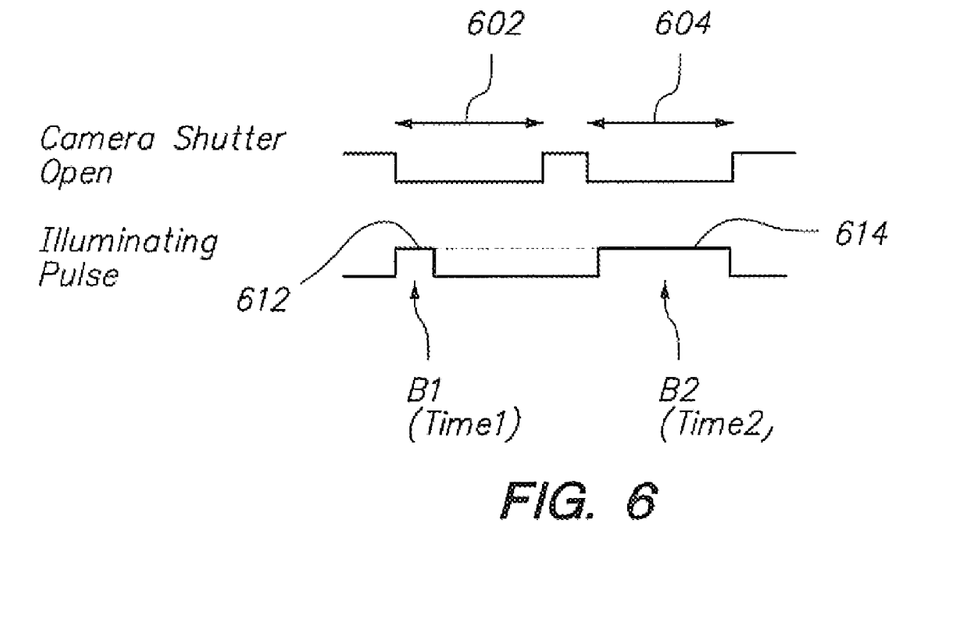
FIG. 6 illustrates application of light for different durations to allow images of a portion of a cytological specimen to be taken at different brightness levels.
Figure 7:
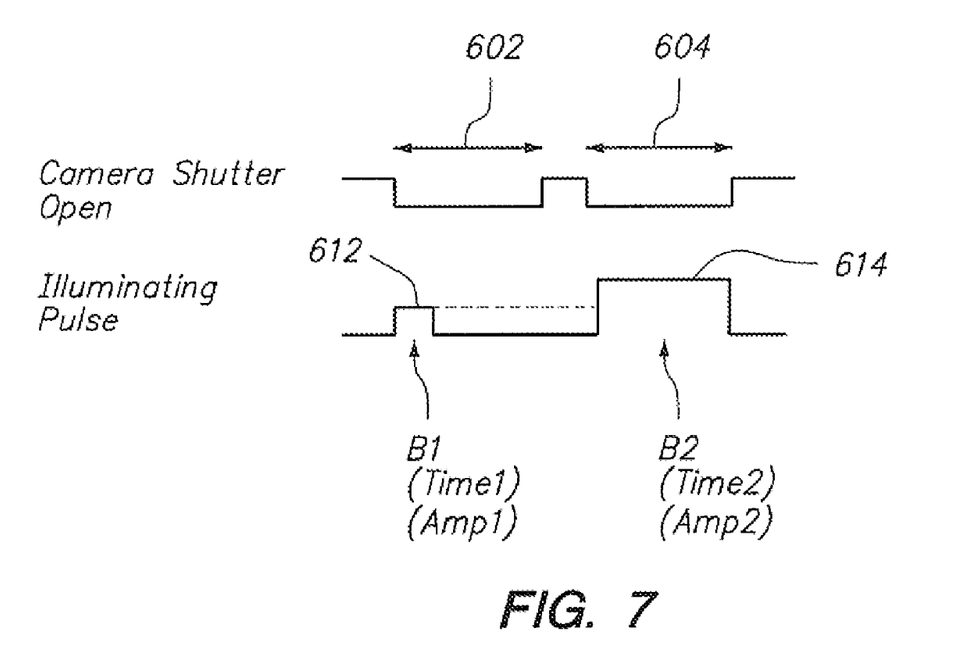
FIG. 7 illustrates application of light for different durations and different amplitudes to allow images of a portion of a cytological specimen to be taken at different brightness levels.

Referring to FIG. 6, one manner in which embodiments can be implemented is by changing the duration of an illumination pulse while the camera 44 shutter is open, and the time during which the shutter is open can also be changed as necessary. As shown in FIG. 6, the camera 44 shutter is open during times 602 and 604. During time 602, an image at a first brightness level or exposure can be acquired by an illumination pulse 610 during time T1. During time 604, an image at a second brightness level or exposure can be acquired using an illumination pulse 612 during time T2. In this example, the amplitudes of the pulses 612 and 614 are the same and higher brightness levels are obtained by extending the duration of the illumination pulse. Persons skilled in the art will appreciate that different exposures can be generated by changing shutter speeds and/or changing f/stop settings. Alternatively, the amplitude of the illumination pulse can be changed. Additionally, as shown in FIG. 7, both the amplitude and the duration of the illumination pulse can be changed to provide different brightness levels.

According to one embodiment, B1 is the brightness level currently utilized by known systems, e.g., a level of 229, based on grayscale 0-255. According to one embodiment, B2 is higher than B1. However, B2 can be the brightness level currently utilized by known systems, and B1 can be higher than B2. This specification refers to B2 as being brighter than B1 for purposes of explanation, not limitation since "first" and "second" brightness levels are not intended to imply any particular order or brightness hierarchy. The image acquired at the lower brightness level B1 can be taken first followed by the image at the higher brightness level B2. Alternatively, the image at the higher brightness level B2 can be taken first followed by the image at the lower brightness level B1. Accordingly, "first" and "second' brightness levels and "B1" and "B2" as used in this specification refer to different brightness levels, not that the "first" level is brighter than the "second" level, and not that an image at a particular brightness level must be taken before another image at another brightness level. Similarly, "first" and "second" images acquired at different brightness levels B1 and B2 as used in this specification refer to different images that were acquired at different brightness levels.

Figure 8:
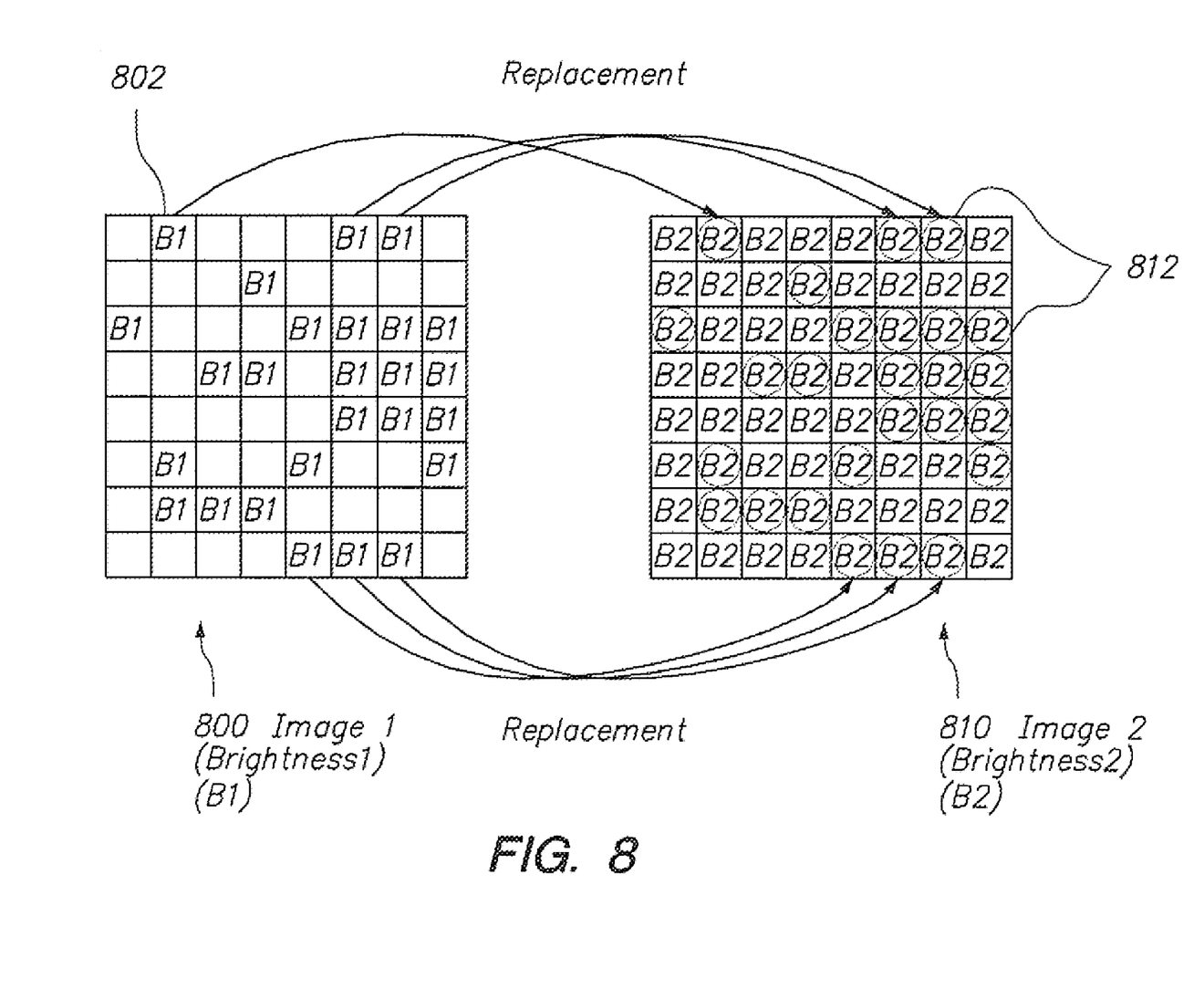
FIG. 8 shows one manner of forming a composite image.
Figure 9:
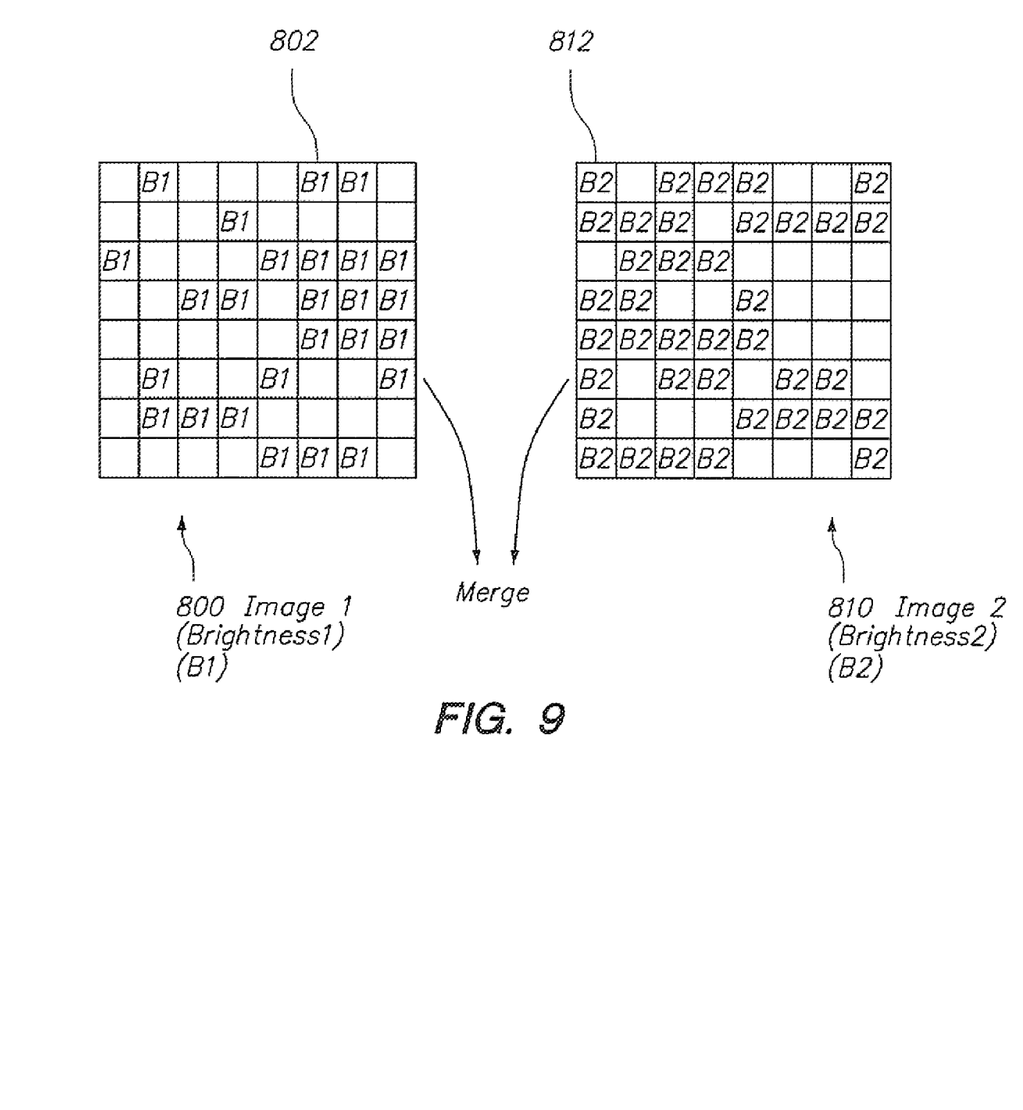
FIG. 9 shows another manner of forming a composite image.
Figure 10:
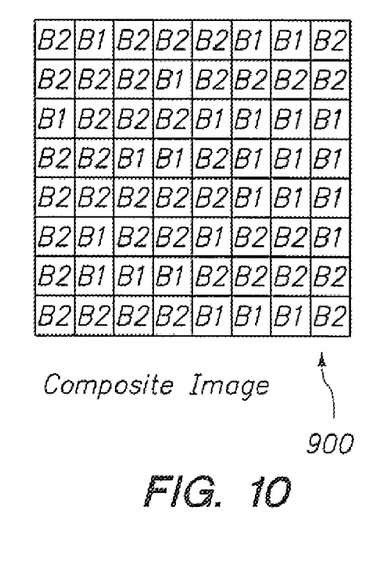
FIG. 10 generally illustrates a composite image of a cytological specimen having sections of images taken at different brightness levels according to one embodiment.

Additionally, FIG. 5, step 530 (combining the selected sections of the first and second images of each image portion to form a composite image) can be performed in various ways. For example, referring to FIG. 8, the selected certain pixels of one image 800 can replace pixels of the other image 810. As shown in FIG. 8, selected sections or pixels (shown by "circled" B2 812) of the second image 810 acquired at B2 are replaced by selected sections or pixels 802 in the first image 800 that was acquired at B1. Alternatively, selected sections or pixels 802 in the first image 800 acquired at B1 can be replaced by selected sections or pixels 812 in the second image 810 at acquired at B2. Additionally, referring to FIG. 9, selected sections or pixels 802 in the first image 800 acquired at B1 can also be merged or combined with selected sections or pixels 812 in the second image 810 acquired at B2. Referring to FIG. 10, whether the replacement (FIG. 8) or merging (FIG. 9) methods are utilized, a composite image 1000 that includes selected sections or pixels 802 and 812 of both images 800 and 810, shown by B1 and B2 pixel identifiers.

Figure 11:
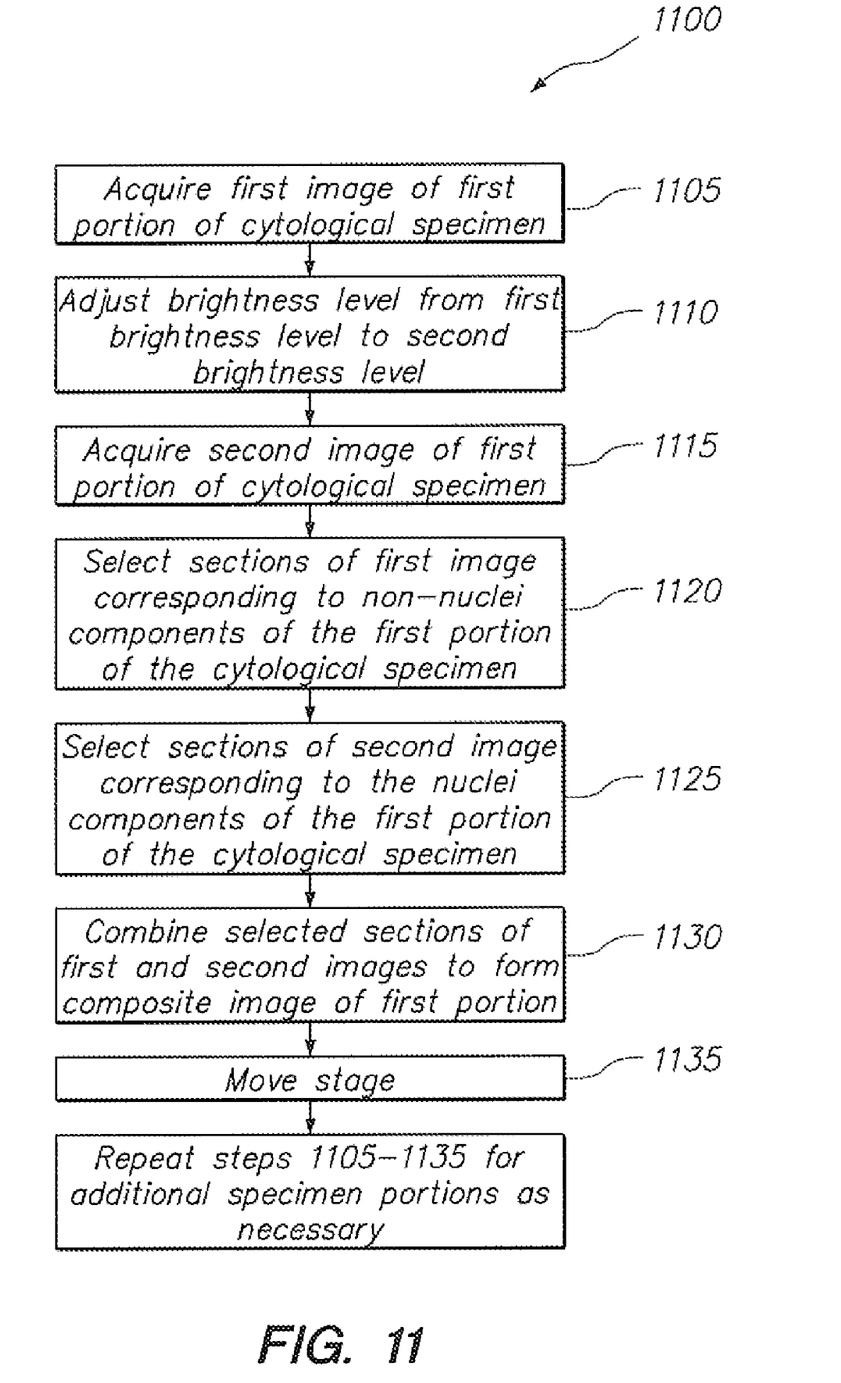
FIG. 11 is a flow chart showing a method of forming an optimally exposed image of a cytological specimen according to another embodiment.

Referring to FIG. 11, in a method 1100 according to another embodiment, sections 802 and 812 of respective images 800 and 810 are selected on the basis whether the sections 802 and 812 correspond to particular cytological components. In step 1105, a first image of a first portion of the cytological specimen is acquired at a first brightness (B1). In step 1110, after the first image is acquired, the brightness is adjusted. For example, the exposure time and/or fstop can be changed to change the brightness level from B1 and B2, e.g., as shown in FIG. 6. In step 1115, a second image of the same first portion of the cytological specimen is acquired at the second brightness (B2). For purposes of explanation, not limitation, this embodiment is described with reference to the second brightness level is higher than the first brightness level.

In step 1120, sections of the first image at the first brightness level are selected if they correspond to certain cytological components. According to one embodiment, sections of the first image are selected if they correspond to non-nuclei components, such as cytoplasm and background. In step 1125, sections of the second image at the second brightness level (B2) are selected if they correspond to certain cytological components. According to one embodiment, sections of the second image are selected if they correspond to nuclei components. Thus, selected sections of the first image (at the lower brightness level) correspond to non-nuclei components, such as cytoplasm and background, and selected sections of the second image (at the higher brightness level) correspond to nuclei. In step 1130, the selected portions of the first and second images are combined to form a composite image (e.g., as shown in FIGS. 8-10). The stage can be moved in step 1135 for imaging of the next specimen portion, and steps 1105-1135 can be repeated as necessary to image additional portions of the specimen. Further, as discussed above with respect to FIG. 5, steps shown in FIG. 11 can be performed in different orders.

Figure 12:
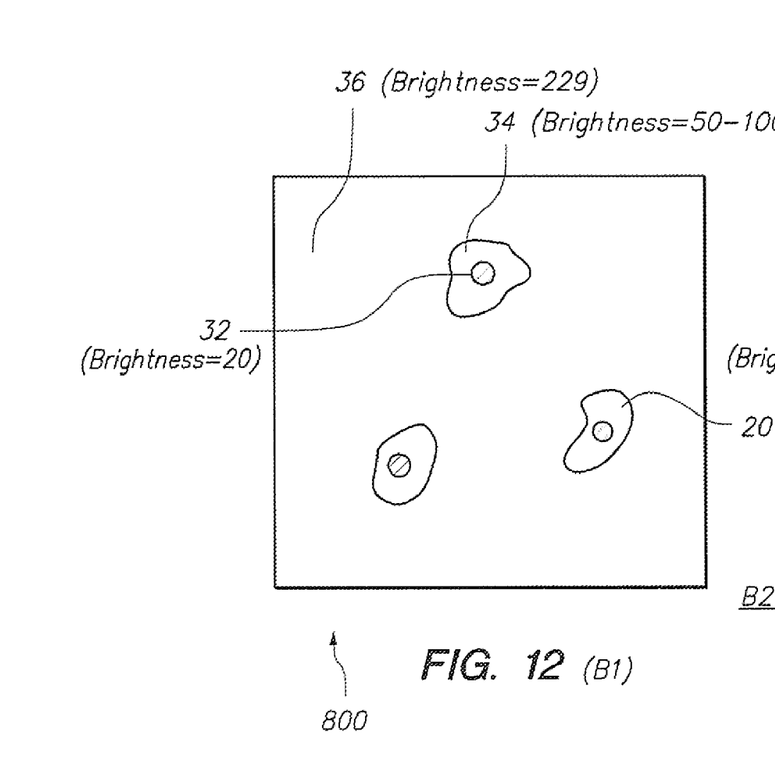
FIG. 12 generally illustrates an image of a portion of a cytological specimen at a first brightness.

FIGS. 12-16 further illustrate how different exposure levels are utilized to generate different images, select sections of the different images, and combine the selected sections to form a composite image. Referring to FIG. 12, according to one embodiment, the first image 800 is acquired at a first brightness level B1 of 229, based on a grayscale 0-255. Certain components of the first image 800 are brighter than other components. In the illustrated embodiment, the brightest section is the background 36, which is "white" and has a brightness level of 229. Cytoplasm 34 is also relatively bright and has a brightness level of about 100. The nuclei 32 are the darkest components in the first image 800 and have a brightness level of 20. Thus, the cytoplasm 34 is about five times as bright as the nuclei 32, and the background 36 is about 11 times as bright as the nuclei 20.

Figure 13:
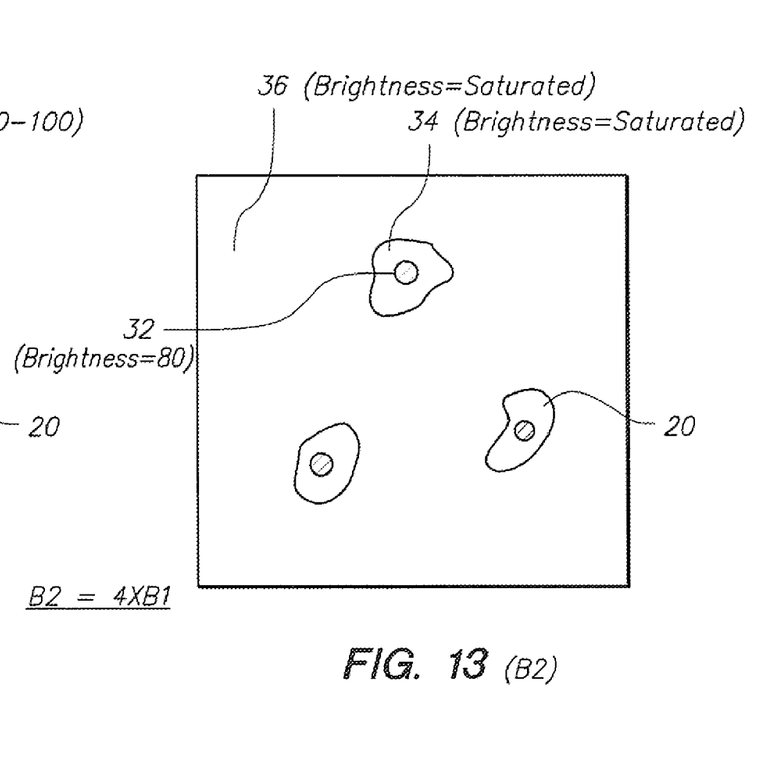
FIG. 13 generally illustrates an image of the portion of the cytological specimen shown in FIG. 12 at a second brightness level that is higher than the first brightness level.

Referring to FIG. 13, the second image 810 is acquired at a second brightness level (B2). In this embodiment, B2 is higher than B1. According to one embodiment, B2 is sufficiently high to illuminate nuclei 20 so that nuclei can be viewed with the desired amount of detail. In one embodiment, B2 is a brightness that sufficiently illuminates nuclei 32 while saturating other parts (such as cytoplasm 34 and background 36) of the second image 810 since, according to one embodiment, only the nuclei 32 are selected from the second image 810. Thus, cytoplasm 34 and background 36 being saturated in the second image 810 does not affect the composite image 1000 since most, if not all, of the saturated sections of the second image 810 are not included in the composite image 1000.

In one embodiment, B2 is about four times as bright as B1. In alternative embodiments, B1 can be increased by different amounts as necessary to sufficiently illuminate nuclei 32 so that nuclei 32 can be viewed with the desired amount of detail. The resulting B2 values may or may not saturate other cytological components depending on the dynamic range of the camera 44. For example, in the embodiment shown in FIGS. 12 and 13 involving a camera 44 having a dynamic range of 0-255 grayscale, B1 was increased by about 400%. Thus, relative to FIG. 12, the brightness of the nuclei 32 in the second image 810 is increased by 400%, or increased from 20 to 80. Increasing the brightness of the cytoplasm 34 and background 36 by 400% results in saturation of these sections since, in this example, the dynamic range of the camera 44 is 0-255. Consequently, increasing B1 by 400% would result in the brightness of cytoplasm 34 and background 36 increasing well beyond the dynamic range (255) of the camera 44. Thus, in the second image 810, the cytoplasm 34 and background 36 are saturated at a brightness level of 255, while the brightness of nuclei s about 80.

Figure 14:
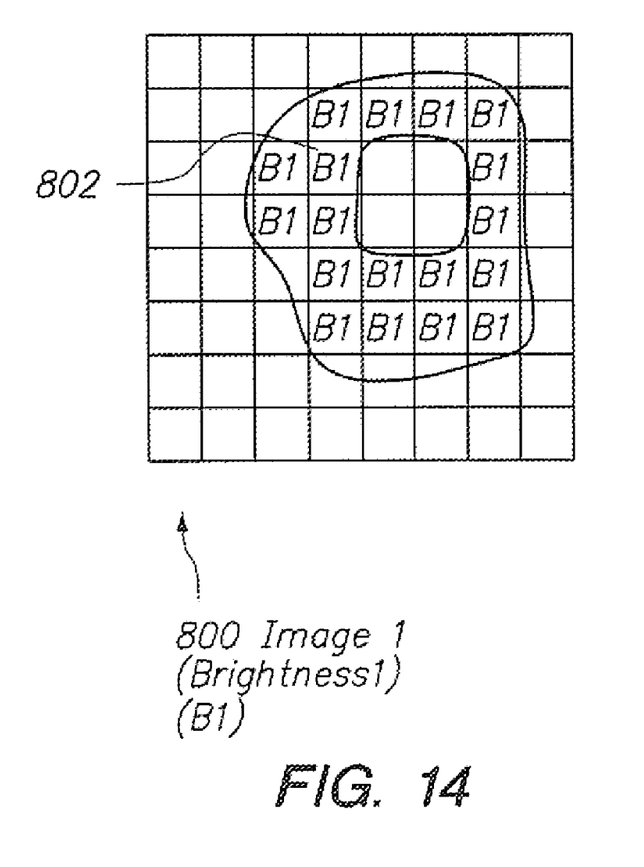
FIG. 14 shows sections of a first image of a portion of a cytological specimen corresponding to non-nuclei components.
Figure 15:
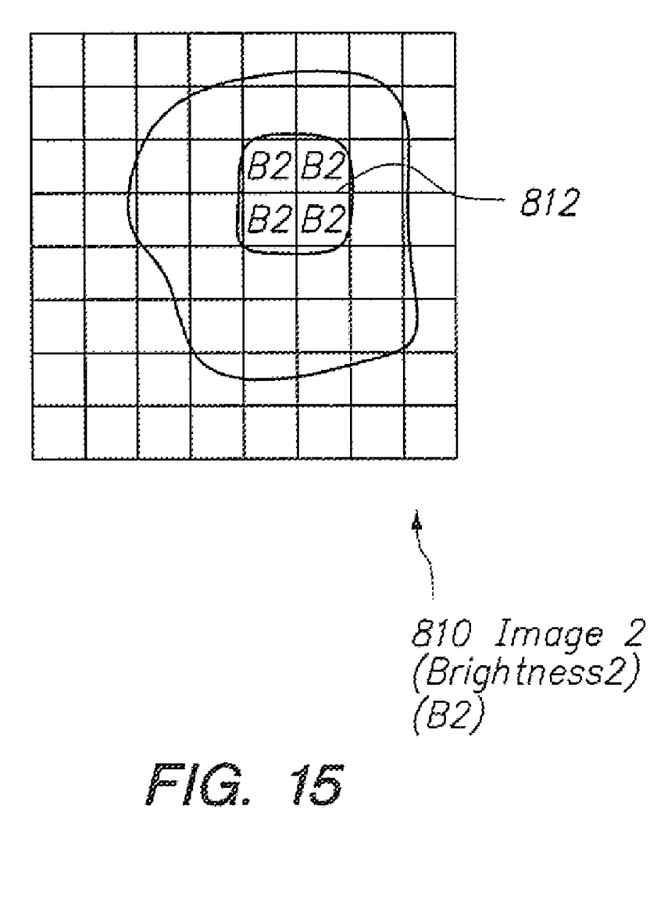
FIG. 15 shows sections of a second image of the portion of the cytological specimen shown in FIG. 14 corresponding to nuclei components.
Figure 16:
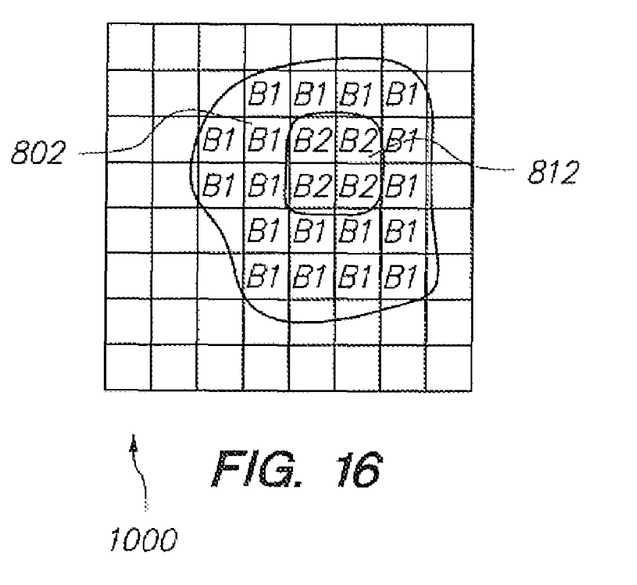
FIG. 16 shows a composite image that includes sections of the first image shown in FIG. 14 and sections of the second image shown in FIG. 15 according to one embodiment.

Referring to FIG. 14, in the illustrated embodiment, sections 802 of the first image 800 at the first brightness level (B1=229) corresponding to cytoplasm 34 at a brightness level of about 100 and background 36 at a brightness of about 229 are selected. Referring to FIG. 15, in the illustrated embodiment, only sections 812 of the second image 810 at the second brightness level (B2=4×B1) corresponding to nuclei 32 at a brightness level of about 80 are selected. As shown in FIG. 16, these selected sections 802 and 812 of respective first and second images 800 and 810 acquired at respective brightness levels B1 and B2 are combined together to form a composite image 1000.

One manner in which a determination is made whether to select a section 802 from the first image 800 acquired at B1 or to select a section 812 from the second image 810 acquired at B2 is based on the cytological component in each portion of the particular type of a cytological component can be determined based on the brightness of a particular pixel or pixels occupied by the component. For example, a determination can be made whether the component is a nuclei 32 or a non-nuclei component (such as cytoplasm 34 and background 36) according to a mask. The mask can be generated based on one of the images and is a collection of binary values (1s and 0s). The "1" values can identify nuclei 32 or portion thereof, and the "0" value can identify non-nuclei components. The mask values can be based on the brightness threshold in the image that is used to generate the mask.

Figure 17:
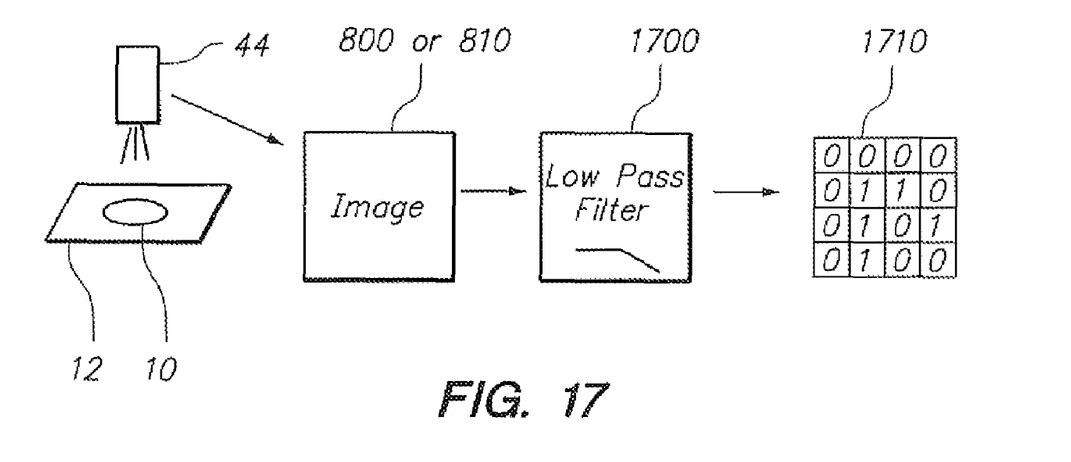
FIG. 17 generally illustrates a system for generating a mask.

For example, an imaging system can look at one of the images and determine which parts of the image have a brightness below a particular threshold. Pixels having a brightness at or below the threshold are determined to be nuclei 32 components. These "nuclei" pixels are labeled with a "1" value in the mask. Otherwise, pixels having a brightness above the threshold are determined to be non-nuclei components. These "non-nuclei" components are labeled with a "0" value I the mask. The collection of "0" and "1" pixel values form a mask, which can then be used to determine whether a given pixel of a composite image 1000 will be populated by a corresponding pixel from the first image 800 or by a corresponding pixel from the second image 810. FIG. 17 illustrates an exemplary system for generating a mask.

Referring to FIG. 17, the camera 44 acquires an image 800 or 810 of the cytological specimen 10 on the slide 12. The image data (0-255 brightness values) is passed through a filter, such as a low pass spatial filter or converter or a median filter, to eliminate single pixel "popcorn" type noise or single pixel noise elements. For example, if a pixel having a gray level brightness of 100 is inside a nucleus that is predominately at a gray level brightness of 20, then the single pixel at the gray level of 100 would not be considered to be a piece of cytoplasm, and the filter 1700 would not permit that pixel to be segmented. The output of the filter 1700 is then binarized to create a mask 1710.

According to one embodiment, the mask 1710 is based on the first image 800 that is acquired at B1. In an alternative embodiment, the mask 1710 is based on the second image 810 that is acquired at B2. The threshold or filter cutoff values can be adjusted, as necessary, depending on the brightness levels used in different images. Thus, FIG. 17 refers to the image being the first image 800 or the second image 810 to indicate that either image can be used to generate the mask 1710.

Figure 18:
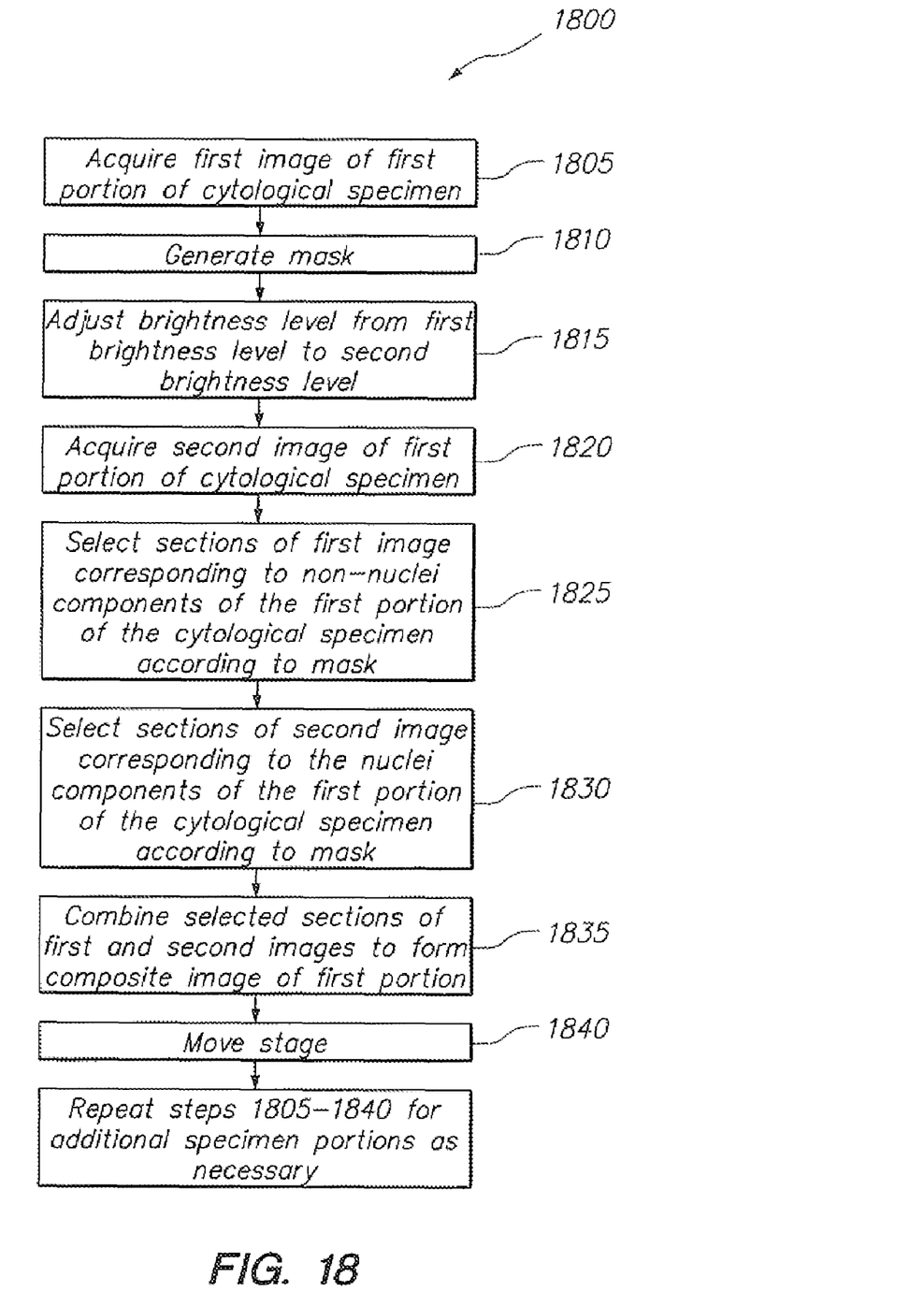
FIG. 18 is a flow chart showing a method of forming an optimally exposed image of a cytological specimen according to another embodiment.

Referring to FIG. 18, according to one embodiment, a method 1800 of forming an optimally exposed image of a portion of cytological specimen includes acquiring a first image of a first portion of the specimen at B1 in step 1805. In step 1810, a mask is generated based on the first image. As discussed above, the mask can be generated based on the second image at B2, but for purposes of explanation, this specification refers to generating the mask based on the first image at B1. In step 1815, the brightness level is increased from B1 to B2. In step 1820, a second image of the same, first portion of the specimen is acquired at B2.

In step 1825, sections of the first image at B1 that correspond to non-nuclei components of the first portion of the specimen are selected according to the mask, i.e., based on the "0" values in the exemplary mask described above. In step 1830, sections of the second image at B2 that correspond to nuclei components of the first portion of the specimen are selected according to the mask, i.e., based on the "1" values in the mask. In step 1835, the selected sections of the first and second images are combined to form a composite image. The stage can be moved in step 1140 for imaging of the next specimen portion, and steps 1805-1840 can be repeated as necessary to image additional portions of the specimen. Further, as discussed above with respect to FIG. 5, steps shown in FIG. 18 can be performed in different orders.

FIGS. 5, 11 and 18 show steps involving a second image at a second brightness level, but there may be times when an image at another brightness level is not necessary. For example, this may occur is when the resulting mask includes all "0" values. Thus, rather than acquiring a second image at the second brightness level or exposure, the second image can be skipped and the system can proceed to the next location.

Figure 19:
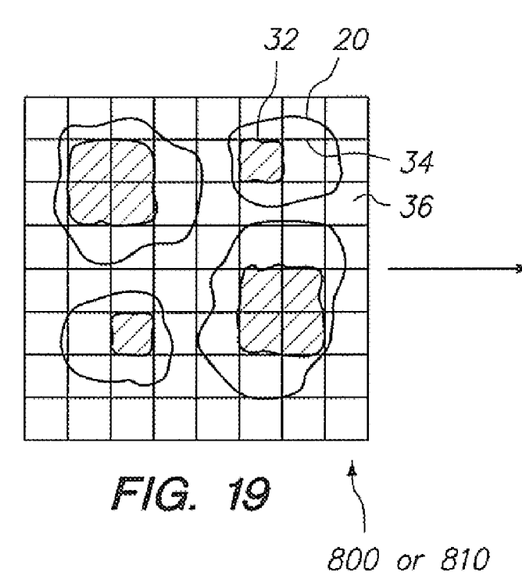
FIG. 19 illustrates generating a mask based on an image.
Figure 20:
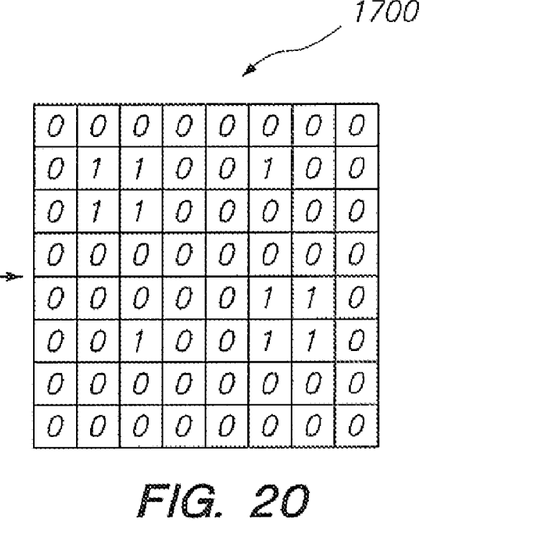
FIG. 20 illustrates a mask that is generated based on the image shown in FIG. 19.

FIGS. 19-23 illustrate a further example of using a mask 1710 to select sections 802 and 812 of first and second images 800 and 812 of portions of the specimen 10 that correspond to nuclei 32 and non-nuclei components (e.g., 34 and 36). Referring to FIG. 19, one of the images 800 or 810 is used to generate a mask 1710. For purposes of explanation and illustration, the image of a portion 20 of a specimen shown in FIG. 19 is shown as having four nuclei 32 or groups of nuclei 32, which are surrounded by cytoplasm 34 and background 36. As shown in FIG. 20, "low brightness" pixels are mapped to "1" values in the mask 1710 shown in FIG. 20. Similarly, the other pixels, which correspond to non-nuclei, such as cytoplasm 34 and background 36, are not passed through the filter 1700 and are mapped to "0" values in the mask 1710 shown in FIG. 20. Thus, the mask 1710 includes a collection of "0" and "1" values identifying in the parent image (either the first image 800 or the second image 810) the locations of respective non-nuclei (34 and 36) and nuclei 32 components.

Figure 21:
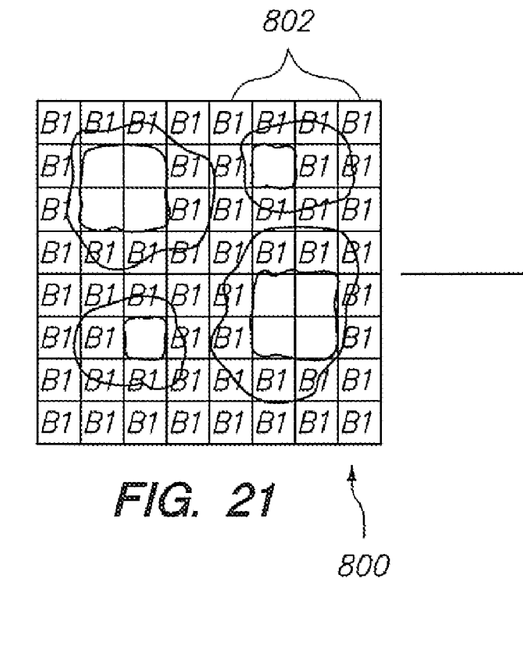
FIG. 21 illustrates sections or pixels of the first image at a first brightness that are selected according to the mask shown in FIG. 20 identifying non-nuclei components.
Figure 22:
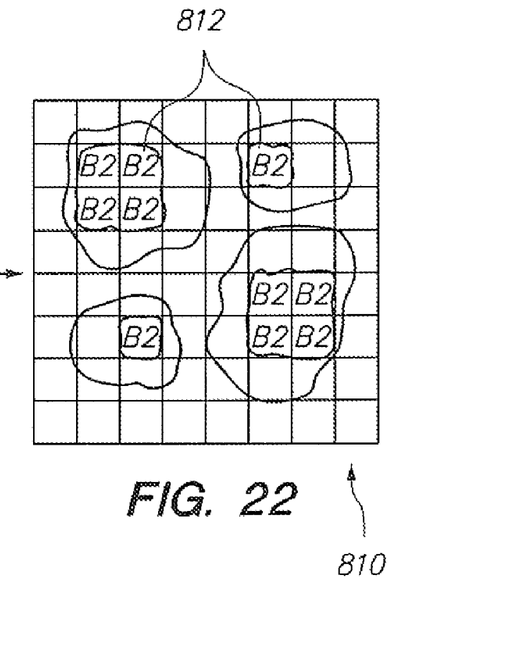
FIG. 22 illustrates sections or pixels of the second image at a second brightness that are selected according to the mask shown in FIG. 20 identifying nuclei components.
Figure 23:
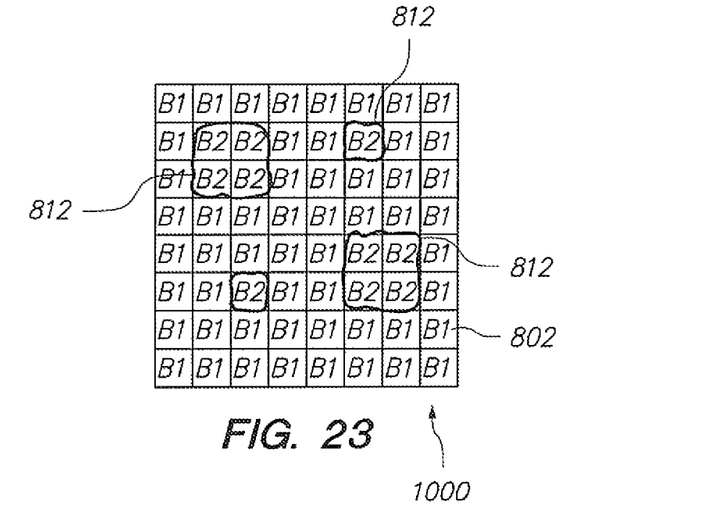
FIG. 23 shows a composite image that includes sections of the first image shown in FIG. 21 and sections of the second image shown in FIG. 22 according to one embodiment.

Having the mask 1710, referring to FIG. 21, sections 802 and 812 of each image 800 and 810 are selected according to the mask 1710. Thus, if the mask 1710 shown in FIG. 20 were overlaid on the first image 800, pixels or sections 802 (identified by B1) of the first image 800 at the first, lower brightness level are selected if a "0" value from the mask 1710 is assigned or mapped to that pixel or section 802. Similarly, as shown in FIG. 22, if the mask 1710 were overlaid on the second image 810, pixels or sections 812 (identified by B2) of the second image 810 at the second, higher brightness level are selected if a "1" value from the mask 1710 is assigned or mapped to that pixel or section 812. In the illustrated embodiment, selected pixels or sections 802 and 812 are exclusive so that when they are combined, a composite image 1000 is formed as shown in FIG. 23. Each pixel of the composite image 1000 is populated by a corresponding pixel or section 802 of the first image 800 or a corresponding pixel or section 812 of the second image 810.

Persons skilled in the art will appreciate that only nuclei components 32 can be mapped to "1" values and only non-nuclei components can be mapped to a "0" value. However, in some cases, it may be beneficial to map areas surrounding a nucleus 32 to a "1' nuclei value to make sure that all of the pixels of an image containing sections of nuclei 32, even small nuclei 32 sections, are selected and included in the composite image 1000. This also provides additional brighter sections around the nucleus 32 to make it easier to ascertain nuclei 32 boundaries. Accordingly, while various figures show selecting sections 802 and 812 of first and second images 800 and 810 and mapping images based on whether a particular pixel or section is a nuclei or non-nuclei, persons skilled in the art will appreciate that the selected or mapped "nuclei" sections 802 and 812 can extend to pixels containing only small portions of nuclei 32 (e.g., a small portion of an outer boundary).

Figure 24:
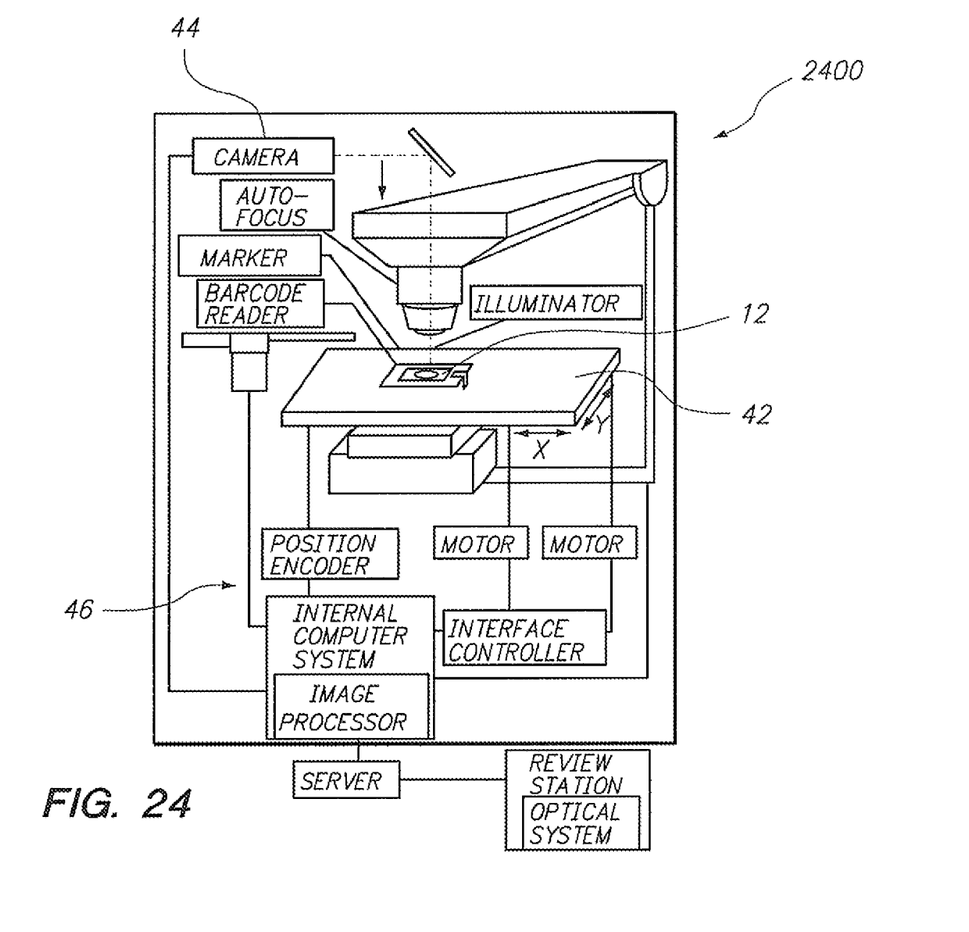
FIG. 24 illustrates an exemplary imaging system in which embodiments of the invention can be implemented.

Further, persons skilled in the art will appreciate that embodiments of the invention can be applied to various imaging systems. One exemplary imaging system 2400 is the system is shown in FIG. 24 and described in the above-incorporated U.S. Pat. No. 7,006,674. Embodiments can be applied to various other cytological imaging systems.

Although particular embodiments have been shown and described, it should be understood that the above discussion is intended to illustrate and not limit the scope of these embodiments, and various changes and modifications may be made without departing from scope of embodiments. For example, embodiments can be applied to take different numbers of images of a specimen at different exposures. Further, the exposure of each image can be optimized to present the particular image component such as nuclei, cytoplasm, white blood cells, different kinds of cells (e.g., squamous and endocervical cells that differ in brightness).

What is claimed is:

1. A method of generating a substantially optimally exposed image of a cytological specimen, comprising:

acquiring a first image of the specimen at a first brightness level;

acquiring a second image of the specimen at a second brightness level higher than the first brightness level;

combining the respective sections of the first and second images to form a substantially optimally exposed image of the cytological specimen;

selecting sections of the first image which correspond to non-nuclei components of the cytological specimen acquired at the first brightness level; and selecting sections of the second image corresponding to nuclei components of the cytological specimen acquired at the second brightness level.

2. The method of claim 1, wherein the first and second images are obtained of substantially a same portion of the specimen, the specimen portion containing both nuclei and non-nuclei components of individual cells.

3. The method of claim 2, wherein nuclei components of the individual cells are more distinct in the second image than in the first image.

4. The method of claim 2, wherein non-nuclei components of the individual cells are more distinct in the first image than in the second image.

5. The method of claim 1, wherein the first brightness level is based on a first exposure time, and the second brightness level is based on a second exposure time different than the first exposure time.

6. The method of claim 1, wherein the second brightness level is about four times greater than the first brightness level.

7. The method of claim 1, wherein the first brightness level is a non-saturation brightness level, and the second brightness level is a saturation brightness level.

8. The method of claim 1, wherein the respective selected sections of the first and second images are combining by replacing pixels of the selected sections of one of the first and second images with pixels of the selected sections of the other one of the first and second images.

9. The method of claim 1, wherein the respective selected sections of the first and second images are combining by merging pixels of the selected sections of the first image with pixels of the selected sections of the second image.

10. The method of claim 1, further comprising generating a mask that includes pixels of the first image representing nuclei and non-nuclei components of the specimen.

11. The method of claim 10, wherein the mask is generated by filtering and binarizing the first image, the mask including binary values representing both nuclei and non-nuclei cells components.

12. A method of generating a substantially optimally exposed image of a cytological specimen, comprising:
   acquiring a first image of the specimen at a first brightness level;
   acquiring a second image of the specimen at a second brightness level higher than the first brightness level; and
   combining the respective sections of the first and second images to form a substantially optimally exposed image of the cytological specimen,
   wherein the first image containing cell nuclei having a gray scale brightness value of approximately 20, non-nuclei cell components having a grayscale brightness value in a range of approximately 50-150, and background having a gray scale brightness of about 229, respectively, based on a gray scale brightness range of 0-255.

13. The method of claim 12, the second image containing cell nuclei having a gray scale brightness value of approximately 80, and non-nuclei cell components and background that are saturated, respectively, based on the gray scale brightness range of 0-255.

14. A method of generating a substantially optimally exposed image of a cytological specimen, comprising:
   acquiring a first image of a first portion of the specimen, the first image being acquired at a first brightness level;
   acquiring a second image of the first portion of the cytological specimen, the second image being acquired at a second brightness level that is higher than the first brightness level;
   selecting sections of the first image corresponding to non-nuclei components of the first portion of the specimen;
   selecting sections of the second image corresponding to the nuclei components of the first portion of the specimen; and
   combining the respective selected sections of the first and second images to form an substantially optimally exposed image of the first portion of the specimen.

15. The method of claim 14, wherein the second brightness level is about four times higher than the first brightness level.

16. The method of claim 14, wherein the first brightness level is a non-saturation brightness level, and the second brightness level is a saturation brightness level.

17. The method of claim 14, wherein nuclei components of the individual cells are more distinct in the second image than in the first image, and wherein non-nuclei components of the individual cells are more distinct in the first image than in the second image.

18. The method of claim 14, wherein the respective selected sections of each of the respective first and second images are combining by merging pixels of the selected sections of the first image with pixels of the selected sections of the second image.

* * * * *